No. 731,698. PATENTED JUNE 23, 1903.
J. E. LITTLE & C. E. ROGERS.
SHOCK OR HAY LOADER.
APPLICATION FILED JUNE 13, 1902.
NO MODEL. 4 SHEETS—SHEET 1.
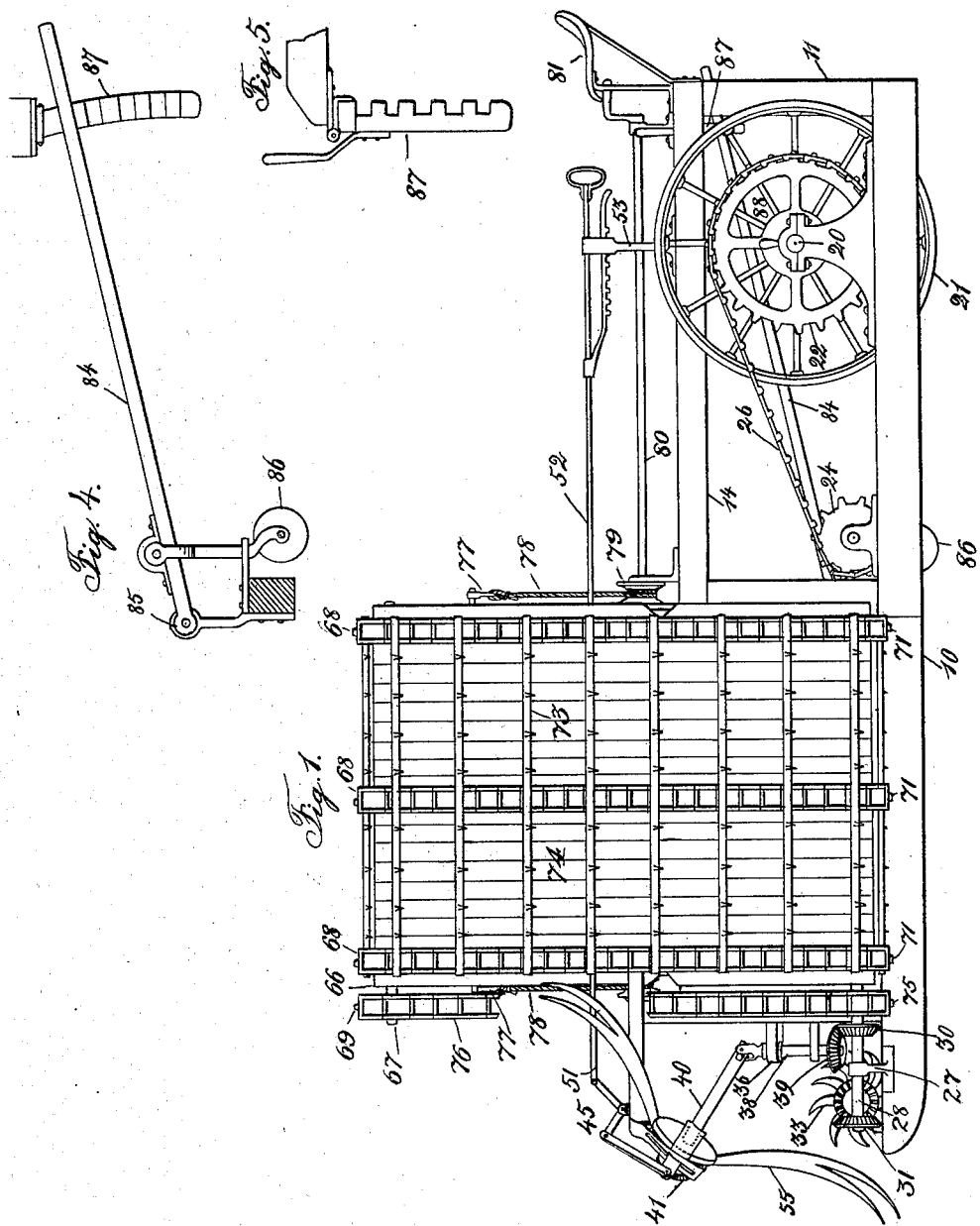
Witnesses:
Henry Manger
R. C. Orwig
Inventors: John E. Little and
Charles E. Rogers.
by Orwig & Lane Atty's.

No. 731,698. PATENTED JUNE 23, 1903.
J. E. LITTLE & C. E. ROGERS.
SHOCK OR HAY LOADER.
APPLICATION FILED JUNE 13, 1902.
NO MODEL. 4 SHEETS—SHEET 2.
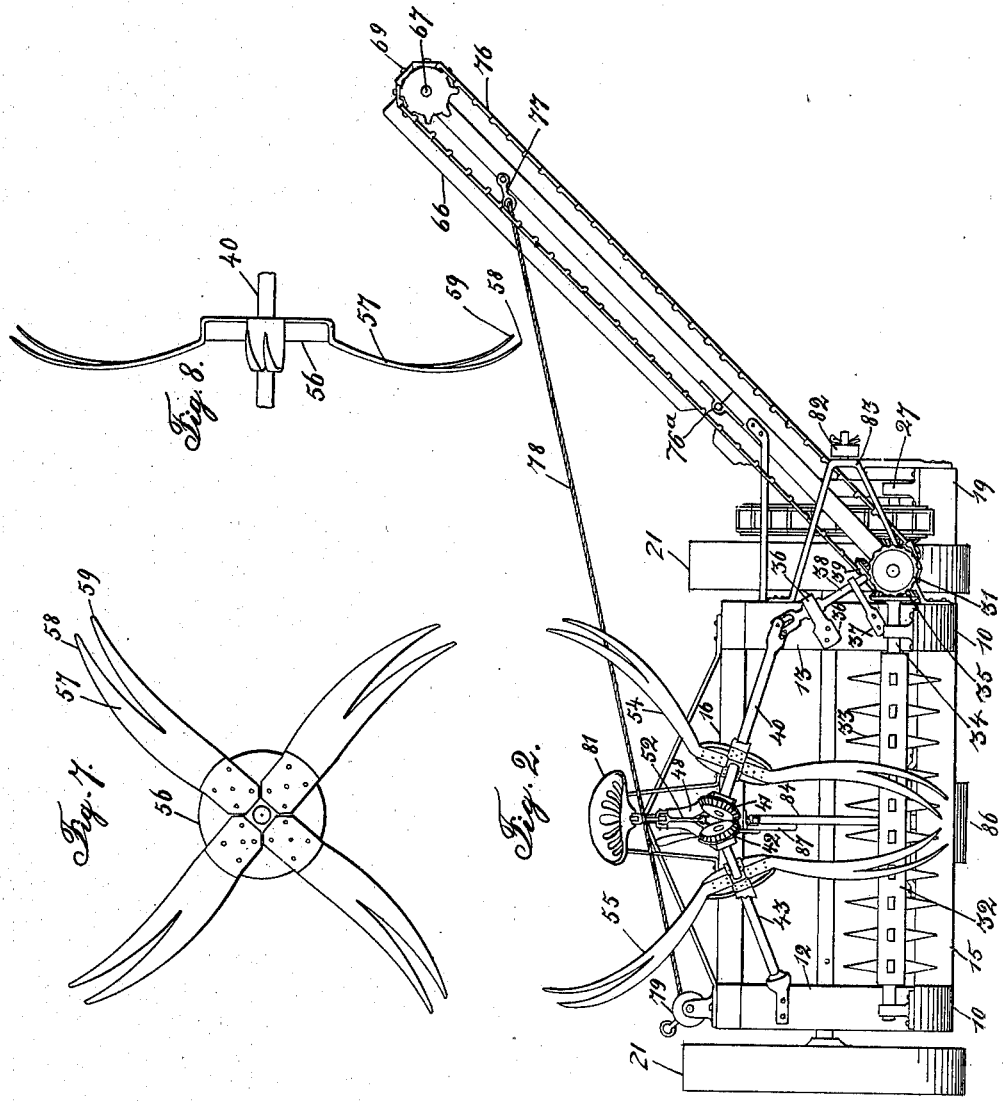

No. 731,698. PATENTED JUNE 23, 1903.
J. E. LITTLE & C. E. ROGERS.
SHOCK OR HAY LOADER.
APPLICATION FILED JUNE 13, 1902.
NO MODEL. 4 SHEETS—SHEET 3.
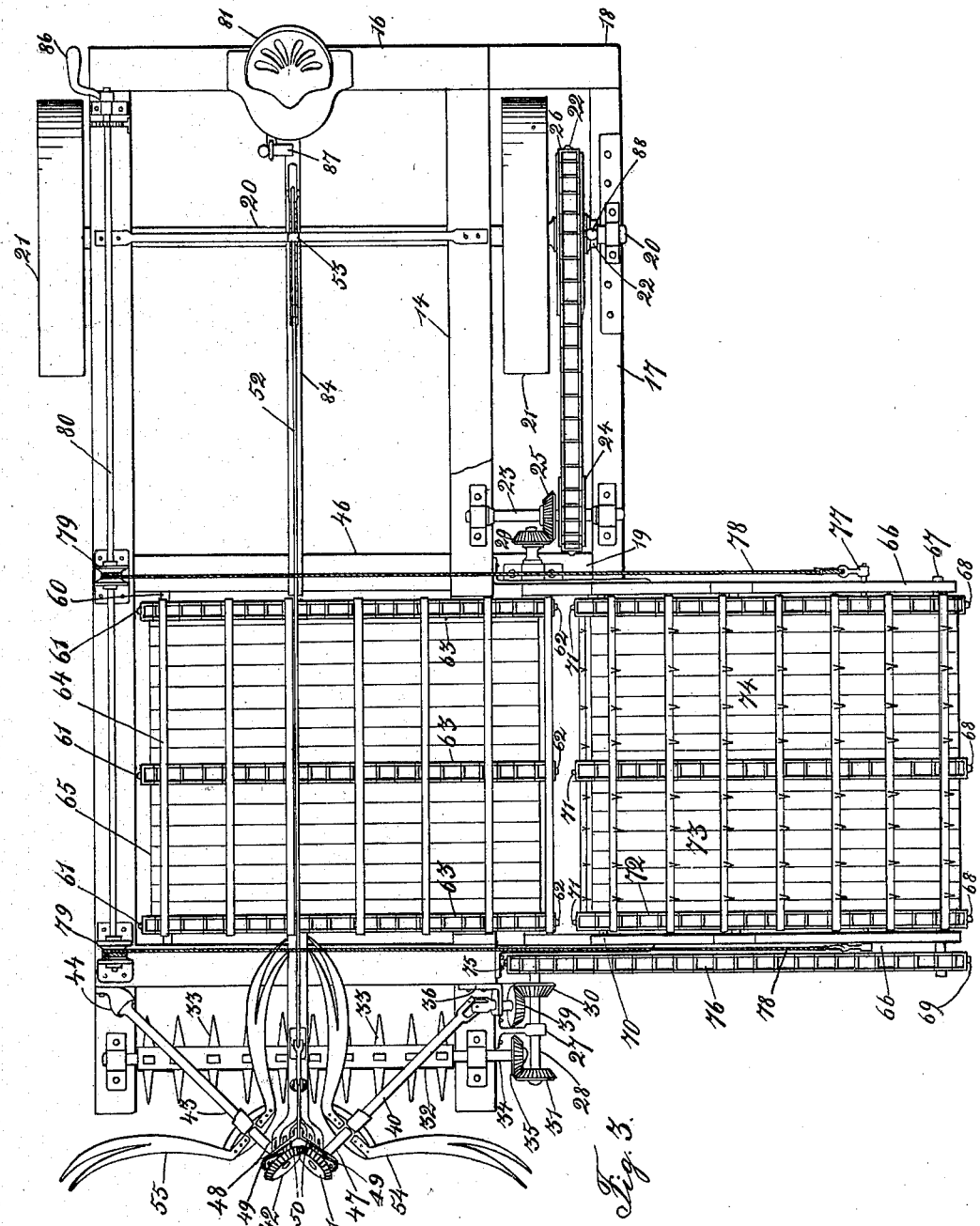
Witnesses:
Henry Manger
R. E. Orwig
Inventors: John E. Little and
Charles E. Rogers.
by Orwig & Lane Atty's.

No. 731,698. PATENTED JUNE 23, 1903.
J. E. LITTLE & C. E. ROGERS.
SHOCK OR HAY LOADER.
APPLICATION FILED JUNE 13, 1902.
NO MODEL. 4 SHEETS—SHEET 4.
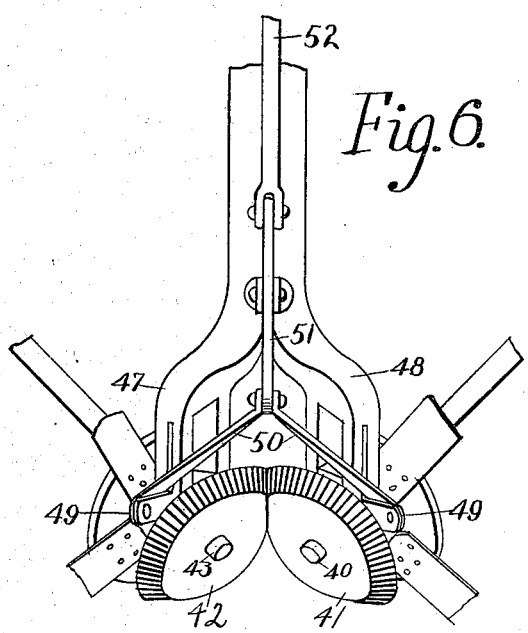
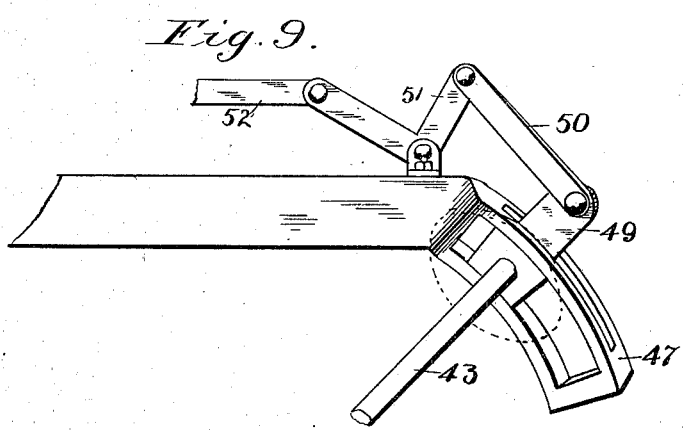

No. 731,698. Patented June 23, 1903.

UNITED STATES PATENT OFFICE.

JOHN E. LITTLE AND CHARLES E. ROGERS, OF DES MOINES, IOWA.

SHOCK OR HAY LOADER.

SPECIFICATION forming part of Letters Patent No. 731,698, dated June 23, 1903.

Application filed June 13, 1902. Serial No. 111,472. (No model.)

*To all whom it may concern:*

Be it known that we, JOHN E. LITTLE and CHARLES E. ROGERS, citizens of the United States, residing at Des Moines, in the county of Polk and State of Iowa, have invented certain new and useful Improvements in Shock or Hay Loaders, of which the following is a specification.

The objects of our invention are to provide a shock and hay loader which will be of simple, durable, and comparatively inexpensive construction and which will take a minimum amount of horse-power to operate.

A further object is to provide a device of the class referred to which will take the hay or shock from the ground and carry it a slight distance upwardly and rearwardly onto the conveyers for placing it on the wagon.

A further object is to provide a shock and hay loader the gathering-arms of which are so constructed that when they are at their outward limit of movement they will be widely separated and as they approach their inward lower limit of movement they will approach each other and cause the shocks to be gathered, even if they are not in a perfectly straight row, and be drawn inwardly and rearwardly onto the lateral conveyer.

A further object is to provide a device of the class described in which the entire mechanism of the loader is driven by gearing attached to one of the traction-wheels of the machine.

A further object is to provide means for raising and lowering the inner ends of the shafts supporting the gathering-arms, so that the position of these arms relative to each other can be changed at the desire of the operator of the machine.

A further object is to provide a roller having teeth thereon so arranged that any scatterings from the shock or the hay which is not taken in by the gathering-arms will be thrown onto the conveyer at the rear of said roller.

A further object is to provide a hay-loader which will pick the hay or shocks up cleanly from the field and at the same time be of very inexpensive construction.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 is a side elevation of the machine, showing one set of the gathering-arms at the front of the machine and some of said arms being broken away, so that the shaft underneath can be shown. A part of the driving-chain at the side of the elevating-conveyer has been broken away to show a portion of the means for changing the position of the gathering-arms. Fig. 2 is a front elevation of the entire loader and shows the relative position of the gathering-arms. Two of the arms of each set of arms have been cut away to show the shafts which support the gathering-arms. The lower portion of the front side of the elevating-conveyer has been cut away to show the traction-wheel and the gear-wheel on the outside of the traction-wheel. Fig. 3 is a top or plan view of the entire loader, showing clearly the gearing of the loader. Fig. 4 shows the lever with the caster-wheel attached to it for raising and lowering the front portion of the loader. Fig. 5 shows the mechanism for holding the lever shown in Fig. 4 at the rear of the frame. Fig. 6 is a detail perspective view of a portion of the device for raising and lowering the arms. Fig. 7 is a face view of one of the sets of gathering-arms, showing the way in which these arms are pronged at their outward extremities and also the way in which the prongs are curved, so that the grain will be easily thrown off from them. Fig. 8 is an edge view of same, showing the way in which the arms are bent. Fig. 9 is a detail view of the front portion of one side of the device for adjusting the shafts at the front of the machine.

Referring to the accompanying drawings, we have used the reference-numeral 10 to indicate the lower side portions of the frame of our loader, said side portions being rounded at their forward extremities, the reference-numeral 11 to indicate the upright posts firmly attached to the upper surface of the lower side portions 10. For the purpose of clear description, we have used the reference-numerals 12 and 13 to indicate the upright posts which are most forwardly and form the front portion of the frame of the loader. Firmly attached to the top of the posts 11, 12, and 13 and forming the sides of the frame are the upper side portions 14. We have provided connecting-pieces 15 between the lower sides 10 of the frame, and we have also provided connecting-pieces 16 between the upper ends of the uprights 14.

We have provided an auxiliary supporting-frame outside of the main frame and at the left of it, having the outer portion 17 and the end portions 18 and 19 therein. The outer portion 17 is substantially parallel with the lower side 10 nearest it. In the frame supported above this auxiliary frame and the lower sides of the main frame is the shaft 20, having the traction-wheels 21 rotatably mounted thereon. The traction-wheel on the left side of the frame is mounted on that portion of the shaft 20 which is between the lower side piece of the frame and the outer portion of the auxiliary frame. Firmly mounted on the shaft 20 and outside of the traction-wheel which is between the main frame and the auxiliary frame is the sprocket-wheel 22. We have rotatably attached the shaft 23 to the upper surface of the left lower side 10 and to the top of the outer portion 17 of the auxiliary frame, said shaft having firmly mounted on it the sprocket-wheel 24 and the beveled gear-wheel 25, said gear-wheel being inside of said sprocket-wheel. We have provided a sprocket-chain 26 to pass over the sprocket-wheels 22 and 24, so that when the sprocket-wheel 22 is driven by means of power applied to the traction-wheel the sprocket-wheel 24 will drive the shaft 23, upon which it is mounted and upon which the beveled gear-wheel 25 is also mounted. Near the forward side portion of the left lower side 10 we have provided the supporting-lug 27. Rotatably mounted in said supporting-lug 27 and in the end portion 19 of the auxiliary frame we have mounted the driving-shaft 28, having the beveled gear-wheels 29, 30, and 31 thereon, said shaft 28 being held by means of the lug 27 and an end portion 19 substantially parallel to the lower side 10 nearest it. The beveled gear-wheel 29 is attached to the rear end of the shaft 28 firmly in such a way that the beveled portion of the gear-wheel 29 will engage the beveled portion of the gear-wheel 25, and when the power is applied the gear-wheel 25 will cause the shaft on which the gear-wheel 29 is mounted to rotate for purposes hereinafter made clear. The gear-wheel 30 is placed on the inside of the lug 27, with its beveled edge nearest said lug. The gear-wheel 31 is at the extreme outer end of the shaft 28 and outside of the lug 27, having its beveled edge nearest the lug 27.

Rotatably mounted on the upper surface and between the sides 10 of the frame and near the extreme forward ends thereof is the tooth-bearing roller 32, the teeth 33 on said roller being arranged in rows longitudinally of said roller, said teeth being curved outwardly and downwardly from said roller, as shown in Fig. 1 of the drawings. These teeth are arranged in this manner, so that as they rotate the hay or shocks of grain will be picked up by the teeth and will be readily thrown off the teeth onto the conveyer at its rear. At the left end of the shaft 34, which supports the roller 32, we have provided the beveled gear-wheel 35 to engage the beveled gear-wheel 31 on the shaft 28, which transmits the power, the beveled gear-wheel 31 being in front of the beveled gear-wheel 35, so that as the shaft 28 rotates the shaft 34 will be rotated and cause the hay or grain to be picked up readily and thrown upwardly and rearwardly. The beveled gear-wheels 35 and 31 are held constantly in contact with each other, because of the way in which the shafts on which they are mounted are attached in their respective places.

We have attached to the upright 13 the brackets 36 and 37, each having an opening through it designed to receive the shaft 38 and hold it in position. The shaft 38 has a collar above and below the bracket 36, designed to allow the shaft 38 to rotate freely in the bracket 36 and at the same time prevent it from slipping in the opening in said bracket. At the lower end of the shaft 38 is the beveled gear-wheel 39, the beveled edge of said gear-wheel being designed to engage the beveled edge of the beveled gear-wheel 30, and the shaft 38 will be rotated as the shaft 28 rotates. To the upper end of the shaft 38 we have attached the shaft 40 by means of a universal joint. The shaft 40 extends upwardly and forwardly relative to the front of the machine and has at its forward upper end a beveled gear-wheel 41, the beveled edge of said gear-wheel being designed to engage the beveled edge of the gear-wheel 42, which is firmly attached to the forward end of the shaft 43. The rear end of the shaft 43 is rotatably mounted by means of a ball-and-socket joint 44 on the upright 12, said ball-and-socket joint 44 being attached to the upright 12 at substantially the same height from the ground as the universal joint at the top of the shaft 38. The shaft 43 extends upwardly and forwardly from the ball-and-socket joint relative to the frame. The shafts 40 and 43 are held in position so that the beveled edges of the gear-wheels 41 and 42 engage each other by means of the supporting-arm 45, said supporting-arm 45 being firmly attached to one of the connecting-pieces 46 of the frame 10, said connecting-piece being substantially at the middle of the frame, it serving the double purpose of a brace for the frame and a means to attach the supporting-arm to. The supporting-arm 45 has the brackets 47 and 48 firmly attached to its front end, said brackets 47 and 48 being substantially at right angles to each other and nearly semicircular in shape and curved forwardly and downwardly from the supporting-arm. These brackets 47 and 48 also have an opening in the central portion of each of them curved substantially the same way as the brackets themselves.

We have provided blocks 49, designed to move longitudinally in the brackets 47 and 48. In these blocks 49, which are respectively placed in the brackets 47 and 48, we have mounted the outer end portions of the shafts 40 and 43 in such a way that when the blocks are moved forwardly or rearwardly in the curved slots the shafts will be raised or lowered and moved rearwardly or forwardly. The slots in the curved brackets 47 and 48 are curved, so that when the shafts 40 and 43 are drawn rearwardly they will be drawn upwardly slightly at the same time, which movement is permitted by means of the universal joint at the lower end of the shaft 40 and the ball-and-socket joint at the lower end of the shaft 43 and will keep the beveled edges of the gear-wheels 41 and 42 constantly in engagement with each other, so that when the position of the shafts 40 and 43 is changed by means of the upward and rearward movement or by the downward and forward movement the gear-wheels 41 and 42 will not be thrown out of mesh with each other. To each of the blocks 49 we have attached a rod 50. Said rods extend upwardly and rearwardly from said block 49, said rods 50 being pivoted to the bell-crank lever 51, which lever is attached pivotally at its central portion to the supporting-arm 45 at its forward end portion and is on the upper surface thereof. To the rear end of the bell-crank lever we have pivotally attached the rod 52, having a handle at its rear end. Said rod extends rearwardly from the bell-crank lever nearly to the back portion of the frame, so that the operator can easily grasp the handle on said rod. The rod is held against longitudinal movement by means of a spring-lever, which is attached to it and has notches in its lower surface designed to engage a slotted upright 53, which is attached to the upper portion of the frame, so that the shafts 40 and 43 can be held in the position desired by the operator.

Firmly attached to the shafts 40 and 43, and back of the gear-wheels 41 and 42 on said shafts we have mounted the sets of gathering-arms 54 and 55, each of said sets of gathering-arms having a body portion 56, having an opening in its central portion, through which the shafts 40 and 43 extend and are fixed. A number of gathering-arms 57 are firmly attached to the body portion 56, each of said gathering-arms 57 having prongs 58 and 59 at their outer ends. Each gathering-arm is bent downwardly relative to the body portion and then a slight distance outwardly, so that the outer ends of the gathering-arms are in substantially the same plane as the upper face of the body portion. The prongs on the gathering-arms are curved forwardly at their lower ends relative to the frame of the machine when the prongs are at their lower limit of movement, so that when the shafts on which the gathering-arms are mounted are rotated in such a way that the gathering-arms mounted on these shafts will cause the substance to be gathered to be taken from in front of the machine and thrown rearwardly onto the lateral conveyer as the machine advances over the ground-surface, and the shocks will be readily released from these gathering-arms on account of the points of the prongs being curved, as indicated.

It will be readily seen that the shafts 40 and 43, to which the sets of gathering-arms are attached, will be rotated on account of the way in which the beveled gear-wheels on these shafts and on the shafts 28 and 23 are arranged, and it will be further seen that a very direct means of transmitting the power is used and that the gathering-arms will be rotated easily on account of the direct action. On account of the way in which the shafts 40 and 43 are placed at an angle relative to the uprights of the frame the gathering-arms in the sets of gathering-arms on the shafts 40 and 43 will be a wide distance apart when at their forward limit of movement, and that as they rotate forwardly and downwardly and then rearwardly it will be seen that these arms first operate a wide distance apart when at their forward limit of movement and that they will grasp the grain from a large area in front of the loader, and that as the arms move downwardly the distance between these gathering-arms will be less and they will draw the hay or grain between them, and as they move rearwardly they approach each other, so that the prongs on the ends of these gathering-arms will be a short distance apart, and on account of their prongs being curved forwardly when the arms are at their lower limit of movement away from the frame of the machine the grain which has been gathered in by the arms and held firmly between them will be readily released from these arms and thrown rearwardly, so that by the rapid revolution of the gathering-arms, which have first an outward and forward then downward and rearward movement, the shocks of grain will be rapidly and cleanly taken from the field in front of the loader when in operation and drawn together on account of the movement of the gathering-arms and thrown rearwardly for the purposes hereinafter made clear. If there is any grain which escapes the gathering-arms, the teeth 33 on the roller 32 will take this and throw it up, and the arms will then meet it and throw it rearwardly, so that a rake is practically provided as well as means for simply gathering the grain when in shocks, so that hay can be as easily loaded with this loader as shocks of grain. Between the two most forwardly connecting-pieces 15 of the frame we have mounted the shaft 60, having the three sprocket-wheels 61 thereon. The shaft 28 also has three sprocket-wheels 62 thereon, corresponding with the sprocket-wheels 61. Over the sprocket-wheels 61 and 62 are passed three conveyer-chains 63, said conveyer-chains being connected by cross-pieces 64. Over the lower portion of the frame we have mounted the platform 65 to prevent any substance from falling beneath the conveyer.

The conveyer which comprises the parts above referred to we have termed for the sake of convenience as the "lateral" conveyer. We have provided an elevating-conveyer, which is designed to take the shocks of grain from the lateral conveyer and carry it upwardly and outwardly, so that it will be thrown out of the frame in the following way: The side pieces 66 are movably attached outside of the ends of the lateral conveyer to the shaft 28, and these side pieces are connected at their outer ends by means of the rotatable shaft 67, said shaft having three sprocket-wheels 68 thereon. Outside of the forward side piece 66 and in front of it and on the shaft 67 we have firmly attached the sprocket-wheel 69. Between the lower ends of the side pieces 66 we have rotatably mounted the shaft 70, having three sprocket-wheels 71 thereon, said sprocket-wheels corresponding to the sprocket-wheels 68 on the shaft 67. Over these sprocket-wheels 71 and 68 we have provided three sprocket-chains 72, having the cross-pieces 73 connecting them, said cross-pieces being at right angles to the conveyer-chains and having teeth in each of them. The shaft 70 is only a slight distance away from the shaft 28, so that as the grain is moved on the lateral conveyer it will be easily and readily thrown onto the elevating-conveyer without falling between them on account of the teeth on the cross-bars in the elevating-conveyer. We have provided a floor 74 to the elevating-conveyer, which the conveyer passes around, so that when the shocks of grain are thrown onto the elevating-conveyer they will be allowed to move simply upwardly and outwardly from the machine and not beneath the cross-pieces of the conveyer. Outside of the forward side piece 66 of the elevating-conveyer and on the shaft 28 we have mounted the sprocket-wheel 75. Over this sprocket-wheel 75 and the sprocket-wheel 69, which is at the opposite end of the elevating-conveyer, we have passed the sprocket-chain 76, this chain being designed to rotate the shaft 67 when the shaft 28 is rotated, and thus cause the elevating-conveyer to move in a direction which will cause the grain to be drawn away from the frame of the machine. We have hinged by means of the hinge 76ª the elevating-conveyer, so that it is composed of an upper and lower portion in order that the upper portion may be folded over the top of the frame of the machine when it is desired by the operator. Near the top of each of the side pieces 66 of the elevating-conveyer we have attached a hook 77 and to their rear ends the ropes 78, which ropes pass above the frame and to the opposite side of it from the elevating-conveyer around the pulleys 79 and attached to them, said pulleys being mounted on the shaft 80, which shaft is rotatably attached to the upper right-hand piece of the frame, and said shaft 80 extending rearwardly to the back end of the frame, so that the operator can easily reach it and raise or lower the elevating-conveyer at his pleasure without getting off of the loader.

We have provided a seat 81 on the top rear portion of the frame in such position that the entire loader can be controlled from it and the horses driven from the same seat. The draft-animals may be attached immediately in front of the traction-wheel from which the power is derived, so that no side draft of the machine is had in operating. The tongue 82, to which the draft-animals are to be hitched, is attached to the upright 13 of the frame and also to the left-hand lower side 10, it being attached to the upright 13 by means of the brackets 83 and to the side piece 10 by a rearward extension of the tongue.

Attached to the under surface of the frame near its central portion is the caster-bearing lever 84, said lever being pivotally attached to the frame and extending to the rear end of the frame, where the operator can easily grasp it from his position on the seat. Near the pivotal point 85 of the lever 84 we have pivotally attached the caster 86 in such a way that when the rear end of the lever is raised or lowered the caster may be correspondingly raised or lowered. If the operator desires to raise the front portion of the frame of the loader, he lowers the rear end of the lever, thereby causing the roller to touch the ground and the frame to which the roller is attached to be moved upwardly. This lever is then held firmly in position by engaging the projections on the locking mechanism 87, which is attached to the frame near the rear of the machine. It will be readily seen that by raising or lowering the lever 84 the front end of the machine can be raised or lowered at the pleasure of the operator, and it may be very essential to do so, owing to some unevenness of the ground over which the loader is about to pass, or it may be desirable to adjust this caster before gathering shocks of grain after hay or other substance which lies closer to the ground has been gathered.

We have provided a gearing device 88, which is of ordinary construction, intended to throw the machine in and out of gear. A full description of this device is deemed unnecessary, as no particular claim is made upon it.

The traction-wheels may be placed nearer the front end of the machine than is shown in the drawings, so that one of the traction-wheels will come immediately underneath the elevating-conveyer and the other traction-wheel will be at the immediate right hand of the lateral conveyer and the other mechanism will remain the same as it is in the present case.

In practical use and assuming that the operator is in a field of grain and that the shocks are standing in the way in which they usually stand in a field—that is, in rows—the operator attaches his horses to the loader, which is in the field, and throws the machine into gear by means of the gearing device above referred to. He then adjusts the caster-bearing lever at the desired position and hitches the wagon on which the shocks are to be loaded at the left of his loader and in such a way that the rack of the wagon will come underneath the outer end of the elevating-conveyer. The two teams of horses which are attached to the loader and to the wagon on which the shocks of grain are to be loaded are driven abreast and straight ahead. As the loader approaches the shocks of grain the gathering-arms, which are in full operation by the time they reach the first shock, rotate in such a way that the arms starting at their upper limit of movement go first forwardly, outwardly, and downwardly until they reach their outward limit of movement, then as they approach their inner limit of movement they move inwardly and rearwardly, so that the grain is gathered from over a large surface of ground and drawn inwardly and rearwardly, and when the arms have reached their lowest limit of movement they move upwardly and rearwardly and separate a slight distance at their end portions, so that the grain will be thrown from off of them onto the lateral conveyer on account of the peculiar shape of the prongs on each arm of the gathering-arms. If there are any sheaves of grain or single straws which the gathering-arms do not reach, the toothed roller gathers these from the ground and draws them upwardly, so that the ends of the prongs of the gathering-arms when they reach position in front of the toothed roller will catch the sheaves or straws which have been picked up by the toothed roller and throw them, together with the sheaves already in engagement with the prongs, onto the lateral conveyer. The lateral conveyer, which is above the platform 65, is constantly moving toward the left side of the frame and toward the elevating-conveyer, so that the shocks of grain which are thrown upon the lateral conveyer are moved in a direction toward the elevating-conveyer and eventually onto the elevating-conveyer, which in turn takes the shocks of grain and carries them above the wagon which is directly underneath its outer end and drops them onto the wagon, where the loader who is on the wagon can easily take care of it and adjust it as he sees fit. The horses attached to the wagon may be driven faster or slower than the horses on the hay-loader, so that the grain can be dropped at any desired place on the wagon. If the upper end of the elevating-conveyer rests against the side of the load which is being loaded on the wagon-rack, and when the traction-wheels of the loader or the wheels of the wagon go into a rut or hole, the elevating-conveyer will be moved a slight distance upwardly without injury to it, owing to its being attached movably to the shaft 70 at the lower end of the conveyer. The operator may also raise or lower the elevating-conveyer, so as to carry the grain to a greater or less height by this conveyer, as he sees fit, by simply turning the shaft 80 by means of the crank 86 at its rear end. The operator can also throw over the upper portion of the elevating-conveyer on top of the frame by simply turning the crank-shaft 80 and drawing this upper portion inwardly and over said frame, and it will leave the loader in much better condition for travel when not desired to be used than if it were in its extended position. The operator may desire to change the position of the gathering-arms slightly, and he can do so by simply operating the raising and lowering mechanism which is attached to it, the rear rod 52 of said mechanism being within easy reach of him, as he sits on the seat at the rear of the loader. The operator can also raise or lower the front portion of the machine at his will in the way which has been clearly set forth hereinbefore by raising or lowering the lever 84.

Having thus described our invention, what we claim, and desire to secure by Letters Patent of the United States therefor, is—

1. In a device of the class described, the combination with a frame, of two shafts rotatably attached at the front end of said frame extending forwardly and upwardly from the point of attachment to said frame in a direction toward each other, gathering-arms mounted on said shafts, for the purposes stated.

2. In a device of the class described, the combination with a frame, of two shafts rotatably mounted at the front end of said frame and extending upwardly and forwardly in a direction toward each other and away from the point of attachment, said shafts being geared together at their inner ends, gathering-arms mounted on said shafts, substantially as and for the purposes stated.

3. In a device of the class described, the combination with a frame, of a tooth-bearing roller rotatably mounted at the front end of said frame, shafts rotatably mounted above said tooth-bearing roller and at the front end of said frame extending upwardly and forwardly toward each other, gathering-arms mounted on said shafts, substantially as and for the purposes stated.

4. In a device of the class described, the combination with a frame, of two shafts rotatably mounted at the front end of said frame extending forwardly and upwardly from their points of attachment to the frame in a direction toward each other, gathering-arms mounted on said shafts, a lateral conveyer mounted in said frame and at the rear of said gathering-arms, for the purposes stated.

5. In a device of the class described, the combination with a frame, of two shafts rotatably mounted at the front end of said frame extending forwardly and upwardly from their points of attachment to the frame in a direction toward each other, gathering-arms mounted on said shafts, a lateral conveyer mounted in said frame and at the rear of said gathering-arms, and an elevating-conveyer mounted at the side of said frame, for the purposes stated.

6. In a device of the class described, the combination with a frame, of two shafts rotatably mounted at the front end of said frame extending forwardly and upwardly from their points of attachment to the frame in a direction toward each other, gathering-arms mounted on said shafts, a lateral conveyer mounted in said frame and at the rear of said gathering-arms, an elevating-conveyer mounted at the side of said frame, and means for raising and lowering the outer end of said elevating-conveyer, for the purposes stated.

7. In a device of the class described, the combination with a frame, of two shafts rotatably attached to the front end of said frame extending forwardly and upwardly from their points of attachment to said frame in a direction toward each other, gathering-arms mounted on said shafts, a tooth-bearing roller rotatably mounted at the front end of said frame and beneath said shafts, and a lateral conveyer extending across the frame and behind the tooth-bearing roller, for the purposes stated.

8. In a device of the class described, the combination with a frame, of two shafts rotatably attached to the front end of said frame extending forwardly and upwardly from their points of attachment to said frame in a direction toward each other, gathering-arms mounted on said shaft, a tooth-bearing roller rotatably mounted at the front end of said frame and beneath said shafts, a lateral conveyer extending across the frame and behind the tooth-bearing roller, and an elevating-conveyer attached at the side of said frame in position to receive material from the lateral conveyer when the device is in operation, for the purposes stated.

9. In a device of the class described, the combination with a frame, of two shafts rotatably attached to the front end of said frame extending forwardly and upwardly from their points of attachment to said frame in a direction toward each other, gathering-arms mounted on said shaft, a tooth-bearing roller rotatably mounted at the front end of said frame and beneath said shafts, a lateral conveyer extending across the frame and behind the tooth-bearing roller, and an elevating-conveyer attached at the side of said frame in position to receive material from the lateral conveyer when the device is in operation, and means for raising and lowering the outer end of said elevating-conveyer, for the purposes stated.

10. In a device of the class described, the combination with a frame, of two shafts rotatably mounted at the front end of said frame extending forwardly and upwardly away from their points of attachment in said frame in a direction toward each other, means for adjusting the inner ends of said shafts forwardly and rearwardly, and gathering-arms mounted on each of said shafts, for the purposes stated.

11. In a device of the class described, the combination with a frame, of two shafts rotatably mounted at the front end of said frame extending forwardly and upwardly away from their points of attachment to the frame in a direction toward each other, gathering-arms mounted on said shafts, a driving mechanism operatively connecting the lower outer end of one of said shafts and one of the traction-wheels of the device, for the purposes stated.

12. In a device of the class described, the combination of traction-wheels, a frame mounted between said traction-wheels, two shafts rotatably attached at the front end of the frame extending forwardly and upwardly from their points of attachment to said frame in a direction toward each other, gathering-arms mounted on said shafts, means for adjusting the inner upper ends of said shafts forwardly or rearwardly, a tooth-bearing roller rotatably mounted at the front end of said frame and beneath said shafts, for the purposes stated.

13. In a device of the class described, the combination of traction-wheels, a frame mounted between said traction-wheels, two shafts rotatably attached at the front end of the frame extending forwardly and upwardly from their points of attachment to said frame in a direction toward each other, gathering-arms mounted on said shafts, means for adjusting the inner upper ends of said shafts forwardly or rearwardly, a tooth-bearing roller rotatably mounted at the front end of said frame and beneath said shafts, and a driving mechanism operatively connecting the lower outer end of one of said shafts, and one of said traction-wheels, for the purposes stated.

14. In a device of the class described, the combination of traction-wheels, a frame mounted between said traction-wheels, two shafts rotatably attached at the front end of the frame extending forwardly and upwardly from their points of attachment to said frame in a direction toward each other, gathering-arms mounted on said shafts, means for adjusting the inner upper ends of said shafts forwardly or rearwardly, a tooth-bearing roller rotatably mounted at the front end of said frame and beneath said shafts, a driving mechanism operatively connecting the lower outer end of one of said shafts and one of said traction-wheels, and a lateral conveyer mounted in said frame at the rear of said tooth-bearing roller and an elevating-conveyer attached at one side of said frame, for the purposes stated.

15. In a device of the class described, the combination of traction-wheels, a frame mounted between said traction-wheels, two shafts rotatably attached at the front end of the frame extending forwardly and upwardly from their points of attachment to said frame in a direction toward each other, gathering-arms mounted on said shafts, means for adjusting the inner upper ends of said shafts forwardly or rearwardly, a tooth-bearing roller rotatably mounted at the front end of said frame and beneath said shafts, a driving mechanism operatively connecting the lower outer end of one of said shafts and one of said traction-wheels, a lateral conveyer mounted in said frame at the rear of said tooth-bearing roller and an elevating-conveyer attached at one side of said frame, and means for raising and lowering the front end of said frame, for the purposes stated.

16. In a device of the class described, the combination with a frame, of two shafts rotatably attached at the front end of said frame extending forwardly and upwardly from their points of attachment to said frame in a direction toward each other, gathering-arms mounted on said shafts and means for raising and lowering the forward end of said frame, for the purposes stated.

17. In a device of the class described, the combination with a frame, of two shafts rotatably attached at the front end of said frame extending forwardly and upwardly from their points of attachment to said frame in a direction toward each other, gathering-arms mounted on said shafts and means for raising and lowering the forward end of said frame, and a tooth-bearing roller rotatably mounted at the front end of said frame and beneath said shaft, for the purposes stated.

18. In a device of the class described, the combination with a frame, of two shafts rotatably attached at the front end of said frame extending forwardly and upwardly from their points of attachment to said frame in a direction toward each other, gathering-arms mounted on said shafts, and means for raising and lowering the forward end of said frame, a tooth-bearing roller rotatably mounted at the front end of said frame and beneath said shaft, and conveyers mounted on said frame, substantially as and for the purposes stated.

JOHN E. LITTLE.
CHARLES E. ROGERS.

Witnesses:
S. F. CHRISTY,
W. R. LANE.